US006769857B2

(12) United States Patent
Nyhof

(10) Patent No.: US 6,769,857 B2
(45) Date of Patent: Aug. 3, 2004

(54) MATERIAL TRANSFER DEVICE

(75) Inventor: Scott L. Nyhof, Hamilton, MI (US)

(73) Assignee: Material Transfer & Storage, Inc., Allegan, MI (US)

(*) Notice: Subject to any disclaimer, the term of this patent is extended or adjusted under 35 U.S.C. 154(b) by 188 days.

(21) Appl. No.: 10/137,959

(22) Filed: May 3, 2002

(65) Prior Publication Data

US 2002/0164237 A1 Nov. 7, 2002

Related U.S. Application Data

(60) Provisional application No. 60/288,390, filed on May 3, 2001.

(51) Int. Cl.$^7$ ............................................. B65B 69/00
(52) U.S. Cl. ..................... 414/421; 414/403; 414/917
(58) Field of Search .............................. 414/421, 403, 414/404, 405, 419, 917; 74/99 R, 469, 479.01, 480 R, 479

(56) References Cited

U.S. PATENT DOCUMENTS

| 5,256,027 A | * 10/1993 | Guest ........................ 414/737 |
| 5,257,877 A | * 11/1993 | Zelinka et al. .............. 414/408 |
| 5,865,590 A | * 2/1999 | Lilley .......................... 414/420 |
| 6,158,945 A | * 12/2000 | Anderson et al. ........... 414/408 |
| 6,186,726 B1 | * 2/2001 | Karpisek .................... 414/421 |

OTHER PUBLICATIONS

Exhibit A is a lift and dump drum dumper that was offered for sale by Material Transfer & Storage Inc. at least as early as May 2, 2000.
Exhibit B is a drum with 75° discharging that was offered for sale by Material Transfer & Storage Inc. at least as early as May 2, 2000.
Exhibit C is a lift and dump container dumper offered for sale by Material Transfer & Storage Inc. at least as early as May 2, 2000.

* cited by examiner

Primary Examiner—Eileen D. Lillis
Assistant Examiner—Michael Lowe
(74) Attorney, Agent, or Firm—Price, Heneveld, Cooper, DeWitt & Litton, LLP

(57) ABSTRACT

A four-bar linkage mechanism for a material transfer device includes a center driving linkage, a center interconnecting linkage, right and left hand support linkages, and right and left hand main linkages. The present invention further includes the method of transferring material using a material transfer device incorporating the four-bar linkage by loading the material container into a dumper frame, positioning a pour hood over the material container, activating a hydraulic cylinder thereby rotating the material container and pour hood about 180 degrees, and releasing the contents of the material container.

18 Claims, 6 Drawing Sheets

MATERIAL TRANSFER DEVICE

CROSS-REFERENCE TO RELATED APPLICATION

The present application claims the benefit of U.S. Provisional Application No. 60/288,390, filed on May 3, 2001, the entire contents of which are hereby incorporated by reference.

BACKGROUND OF THE INVENTION

Lift and seal container dumpers have been used for many years to transfer materials from one container into another without contaminating the materials. Generally, existing material transfer devices are custom made for a specific situation. While use of a controlled constant lift is most preferable, known material handling equipment can only provide, at most, a 150 degree rotation while providing steady movement of the material container. However, this limited angular rotation does not allow for complete transfer of all material. Previously, when a 180 degree rotational cycle was desired, the end of the rotational cycle progressed much quicker than the initial rotational velocity. These conditions were/are exacerbated by the sheer weight and/or volume of material typically being transferred by such material transfer machines. Therefore, the desired steady rate transfer of material from one container into another throughout the full 180 degree rotational cycle has not, to Applicant's knowledge, been previously achieved.

Therefore, there is a significant need for a linkage mechanism and 180 degree rotational lift and seal container dumper apparatus, which can provide a steady 180 degree rotational cycle speed while transferring material that is typically voluminous and/or heavy. This further would allow for transfer of substantially all the material.

SUMMARY OF THE INVENTION

One aspect of the present invention is a four-bar linkage mechanism for a material transfer device having a main support frame and a material transfer frame. The mechanism includes a center driving linkage, a center interconnecting linkage, right and left hand support linkages, and right and left hand main linkages. The center driving linkage has a first end and a second end and first and second apertures at each end. The center interconnecting linkage has a first end and a second end and first and second apertures at each end. The right hand support linkage has a first end and a second end where the second end is at least partially curvilinear with an aperture at the first end and the second end where the first end aperture of the right hand linkage is substantially concentric with the first aperture of the center driving linkage. The left hand support linkage has a first end and a second end where the second end is at least partially curvilinear with an aperture at the first end and the second end where the first end aperture of the left hand linkage is substantially concentric with the first aperture of the center driving linkage. The right hand main linkage has a first end and a second end and first and second apertures at each end and a third aperture between the first and second apertures. The first aperture of the right hand main linkage is substantially concentric with the first aperture of the center interconnecting linkage and the third aperture is substantially concentric with the second aperture of the center driving linkage. The left hand main linkage has a first end and a second end and first and second apertures at each end and a third aperture between the first and second apertures. The first aperture of the left hand main linkage is substantially concentric with the first aperture of the center interconnecting linkage and the third aperture is substantially concentric with the second aperture of the driving linkage. The second end of the right and left hand support linkages and the second end of the right and left hand main linkages are engaged with the main support frame and the second end of the center driving linkage is engaged with the material transfer/dumper frame. Lastly, each linkage is interconnected by pins spaced within each of the substantially concentric apertures.

Another aspect of the present invention is a material transfer device including a main support frame, a dumper frame, and a hydraulic cylinder with a frame engaging end engaged to the main support frame and an actuating end. A four-bar linkage interconnects the actuating end of the hydraulic cylinder and the dumper frame. The four-bar linkage includes a driving linkage, force applying right and left hand support linkages, and right and left hand main linkages. The driving linkage has first and second ends and first and second apertures at the first and second ends, respectively. The force applying linkage has a first end and a second end and first and second apertures at each end. The force applying linkage and the driving linkage are spaced between the right hand support linkage and the left hand support linkage as well as the right hand main linkage and the left hand main linkage. The right hand support linkage has a first end and a second end where the second end is at least partially curvilinear with an aperture at the first end and the second end. The first end aperture of the right hand support linkage is substantially concentric with the first aperture of the driving linkage. The left hand support linkage has a first end and a second end where the second end is at least partially curvilinear with an aperture at the first end and the second end. The first end aperture of the right hand support linkage is substantially concentric with the first aperture of the driving linkage. The right hand main linkage has a first end and a second end and first and second apertures at each end and a third aperture between the first and second apertures. The first aperture of the right hand main linkage is substantially concentric with the first aperture of the center force applying linkage and the third aperture is substantially concentric with the second aperture of the driving linkage. The left hand main linkage has a first end and a second end and first and second apertures at each end and a third aperture between the first and second apertures. The first aperture of the left hand main linkage is substantially concentric with the first aperture of the center force applying linkage and the third aperture is substantially concentric with the second aperture of the driving linkage. The second end of the right and left hand support linkages and the second end of the right and left hand main linkages are engaged with the main support frame and the second end of the driving linkage is engaged with the dumper frame. Each of the linkages are interconnected by pins spaced within each of the substantially concentric apertures.

In yet another embodiment of the present invention, the method of transferring material about 180 degrees includes providing a material container that contains material, a main support frame, a hopper frame containing a hopper, a pour hood, a dumper frame having a rectangular primary, and a rim, a linkage actuating hydraulic cylinder with a frame engaging end engaged to the main support frame, an actuating end, and a four-bar linkage interconnecting the actuating end of the hydraulic cylinder and the dumper frame. The four-bar linkage includes a driving linkage, a force applying linkage, right and left hand support linkages, and right and left hand main linkages.

The driving linkage has a first end and a second end and first and second apertures at each end. The force applying linkage has a first end and a second end and first and second apertures at each end.

The right hand support linkage has a first end and a second end where the second end is at least partially curvilinear and has an aperture at the first end and the second end. The first end aperture of the right hand support linkage is substantially concentric with the first aperture of the driving linkage.

The left hand support linkage has a first end and a second end where the second end is at least partially curvilinear and has an aperture at the first end and the second end. The first end aperture of the right hand support linkage is substantially concentric with the first aperture of the driving linkage.

The right hand main linkage has a first end and a second end and first and second apertures at each end as well as a third aperture between the first and second apertures. The first aperture of the right hand main linkage is substantially concentric with the first aperture of the center force applying linkage. The third aperture is substantially concentric with the second aperture of the driving linkage. The left hand main linkage has a first end and a second end and first and second apertures at each end as well as a third aperture between the first and second apertures. The first aperture is substantially concentric with the first aperture of the center force applying linkage. The third aperture is substantially concentric with the second aperture of the driving linkage. The second end of the right and left hand support linkages and the second end of the right and left hand main linkages are engaged with the main support frame and the second end of the driving linkage is engaged with the dumper frame. Each linkage is interconnected by pins spaced within each of the substantially concentric apertures.

The material container is loaded into the dumper frame. Next, the pour hood is positioned over the material container. The operator then activates the linkage actuating hydraulic cylinder thereby rotating the material container and pour hood about 180 degrees until the pour hood engages the hopper. The material in the material container is released into the hopper.

These and other features, advantages, and objects of the present invention will be further understood and appreciated by those skilled in the art by reference to the following specification, claims, and appended drawings.

DETAILED DESCRIPTION OF PREFERRED EMBODIMENT

Figure 1:
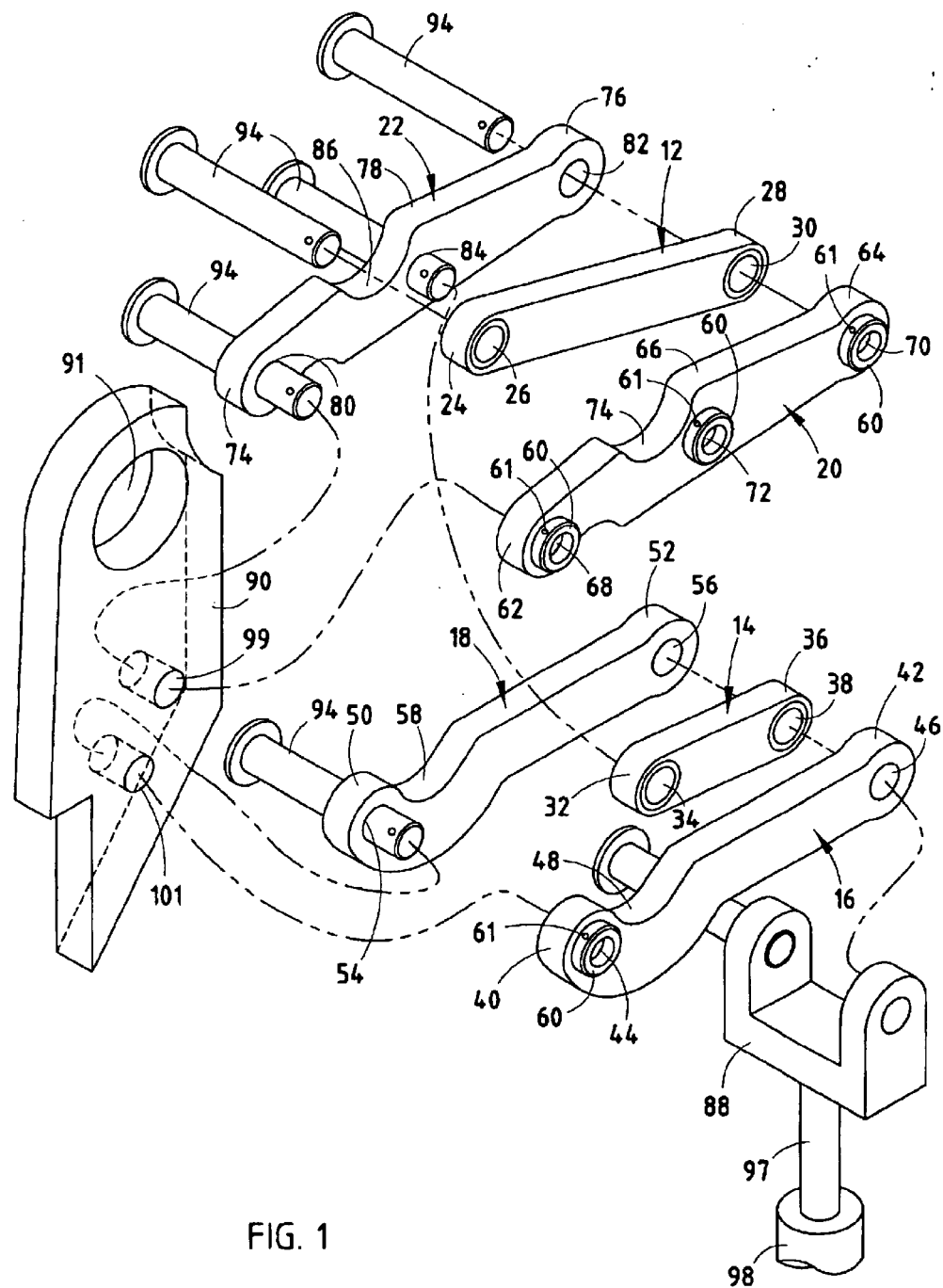
FIG. 1 is a partially fragmentary, exploded perspective view of a four-bar linkage system according to the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The four-bar linkage 10 (FIG. 1) generally includes a center driving linkage 12, a center interconnecting linkage 14, a right hand support linkage 16, a left hand support linkage 18, a right hand main linkage 20, and a left hand main linkage 22. The linkages are preferably steel. The steel may be polished. A preferred steel linkage material is ASTM A36 or steel of comparable strength. The steel preferably has a tensile yield stress of about 36,000 psi, a compressive yield stress of about 36,000 psi, and a modulus of Elasticity of about 29,500,000 psi. The center driving linkage 12 has a first end 24 with a first aperture 26 and a second end 28 with a second aperture 30. In the preferred embodiment, the first and second apertures 26, 30 have a radius of about one inch. The center driving linkage 12 is preferably about 13.680 inches from the first end 24 to the second end 28. The distance between the center of the first aperture 26 and the center of the second aperture 30 is about 2 inches less, about 11.680 inches. The center driving linkage 12 is about 1.5 inches thick. A wash down, heavy duty, self-lubricating flange bearing is preferably press fit into each aperture 26 and 30.

The center interconnecting linkage 14 has a first end 32 with a first aperture 34 and a second end 36 with a second aperture 38. In the preferred embodiment, the first and second apertures 34, 38 have a radius of about one inch. The distance between the center of the first aperture 34 and the center of the second aperture 38 is preferably about 6.547 inches. The distance between the first end 32 and the second end 36 is about 8.547 inches. The center interconnecting linkage 14 is preferably about 1.5 inches thick. As with the center driving linkage 12, a wash down, heavy duty, self-lubricating flange bearing is preferably pressed fit into each aperture 34, 38.

The right hand support linkage 16 and left hand support linkage 18 are preferably mirror images of one another. The right hand support linkage 16 has a first end 40 and a second end 42. The first end 40 has a substantially curvilinear portion 48 and a first aperture 44. The second end 42 has a second aperture 46. The outwardly facing side of the right hand support linkage 16 (side facing away from the center linkages 12, 14) has a shaft collar 60 engaged, preferably by a weld, and substantially concentric with the first aperture 44. In the preferred embodiment, the distance between the center of first aperture 44 and the center of the second aperture 46 is about 11.372 inches. In the preferred embodiment, a wash down, heavy duty, self-lubricating flange bearing is press fit into second aperture 46.

Similarly, the left hand support linkage 18 has a first end 50 with a first aperture 54 and a second end 52 with a second aperture 56. As in the case of the right hand support linkage 16, the first end 50 of the left hand support linkage 18 has a curvilinear portion 58. Also, with the right hand support linkage 16, the left hand support linkage 18 has a shaft collar 60 engaged, preferably by a weld, and concentric with the first aperture 54. A wash down, heavy duty, self-lubricating flange bearing is preferably press fit into second aperture 56.

The four-bar linkage 10 also includes mirror image main linkages, a right hand main linkage 20 and a left hand main linkage 22. The right hand main linkage 20 has a first end 62, a second end 64, and a center section 66. The first end 62 has a first aperture 68 and the second end 64 has a second aperture 70. The center section 66 has a center aperture 72. A portion 74 of the right hand main linkage 20 between the center aperture 72 and the first end 62 is preferably removed to allow full range of motion of the assembly in the preferred embodiment, as will be discussed later.

The left hand main linkage 22 has a first end 74, a second end 76, and a center section 78. The left hand main linkage 22 has a first aperture 80, a second aperture 82, and a center aperture 84. As with the right hand main linkage 20, a portion 86 of the left hand main linkage 22 between the center section 78 and the first end 74 is removed from the linkage, in the preferred embodiment, to allow full range of motion.

In the case of both the right hand main linkage 20 and the left hand main linkage 22, the outwardly facing surface (the surface facing away from the center linkages) preferably has three shaft collars 60 engaged, preferably by a weld, and concentric to the first, second, and center apertures of both the right and left hand main linkages 20, 22. There is preferably about 13.82 inches between the first apertures 68, 80 and second apertures 70, 82 in the left hand main linkages 22 and right hand main linkages. The center apertures are preferably about 6.908 inches from the center of the first apertures 68, 80. The left and right hand main linkages are preferably about 2 inches thick.

All of the shaft collars 60 are preferably about 9/16 inches thick and about 1 5/8 inches in total diameter from edge to edge. The shaft collars 60 are preferably chamfered at an angle of about 45 degrees. Preferably, the shaft collars 60 have a pin locking member receiving bore hole 61. The second apertures of the center interconnecting linkage 14 and the right and left hand support linkages 38, 46, and 56, are aligned to be substantially concentric with the machined clevis mounting bracket 88. The second apertures of the left and right hand support linkages are concentric with an aperture on mounting bracket 90. The second apertures of the left and right hand main linkages are aligned substantially concentrically with a second aperture on mounting bracket 90. The second aperture 30 of center driving linkage 12 is aligned substantially concentric with the apertures on both support prongs of the material transfer frame bracket 92.

Pins 94 of various lengths are inserted into the substantially concentrically aligned apertures to retain engagement of the linkage components with each other and with the machined clevis mounting bracket 88, mounting bracket 90, and material transfer frame bracket 92. The pin 94, engaging the left and right hand support linkages to the mounting bracket 90, via aperture 101, is preferably about 6 3/8 inches long. Each of the pins 94 engaging the left and right hand main linkages are approximately 7 3/8 inches long. The pin 94 engaging the first apertures of the left and right hand main linkages and the first aperture of the driving linkage is approximately 7 3/8 inches, as well as the pin 94 engaging the center apertures of the left and right hand main linkages and the second aperture of the center interconnecting linkage. The last approximately 7 3/8 pin engages the mounting bracket 90, via aperture 99, with the second apertures 70, 82 of the left and right hand main linkages. A pin 94, approximately 8 3/4 inches long, extends through the two sides of the clevis mounting bracket 88 and the second aperture of the center interconnecting linkage 14. Each of the pins 94 preferably have a plug weld 3–4 inch flat washer on one end and a bore hole on the other for receiving a pin retaining member, preferably a coiled spring pin.

Mounting bracket 90 has an aperture 91 for receiving main rotating bar 96. The mounting bracket 90 is engaged to horizontal member 112 of main frame section 104, preferably by a weld. Apertures 99, 101 of mounting bracket 90 preferably have a wash down, heavy duty, self lubricating flange bearing press fit into each aperture.

The machined clevis mounting bracket 88 is engaged with rod 97 of cylinder 98. Cylinder 98 is preferably a hydraulic cylinder. Hydraulic cylinder 98 is preferably attached to lower horizontal main frame member 114 using a 4 1/2 inch pin, as described above.

Figure 6:
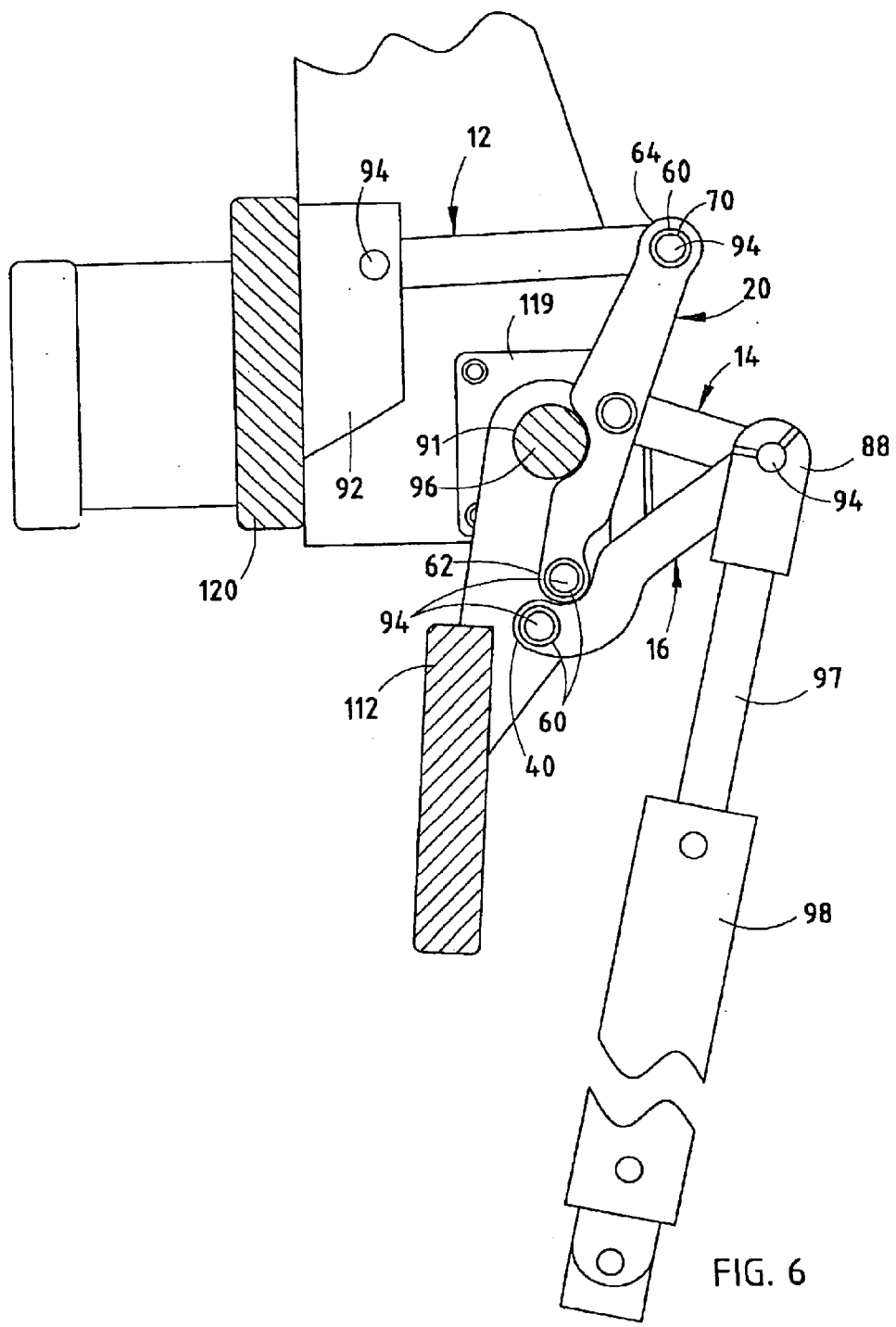

FIGS. 3–6 show the four-bar linkage as it progresses from a loading position to a dumping position. FIGS. 3–6 show main rotating bar 96, mounting bracket 90, and their attachment to horizontal main frame member 112. As can be seen in FIG. 6, the portion of the right hand main linkage 20 and left hand main linkage 22, which are removed, portions 74 and 86, allow for the four-bar linkage to proceed through its full range of motion uninhibited by main rotating bar 96. Main rotating bar 96 is mounted using bracket 119 to material transfer frame member 105.

Figure 2:
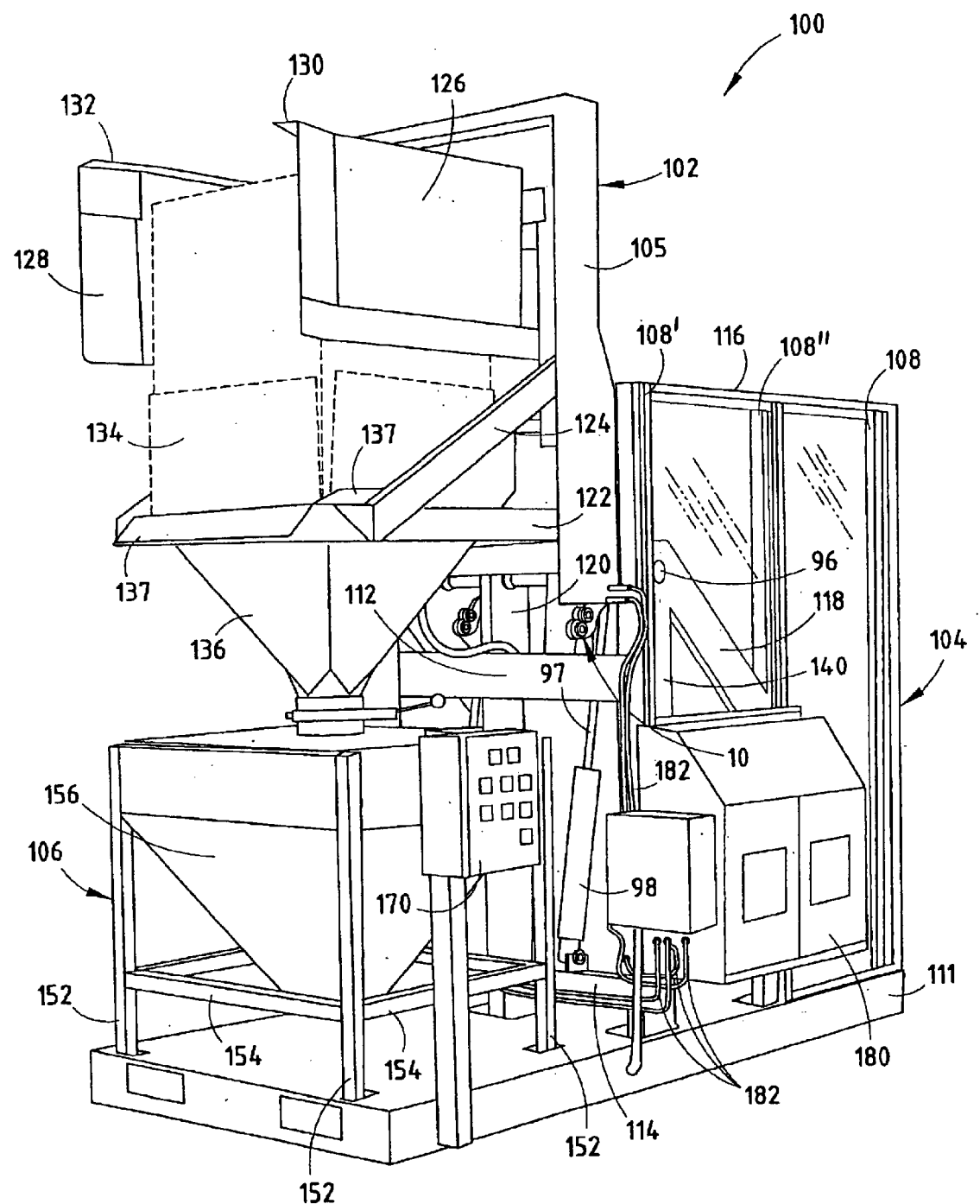
FIG. 2 is a perspective view of a material transfer system incorporating the four-bar linkage of FIG. 1.
Figure 3:
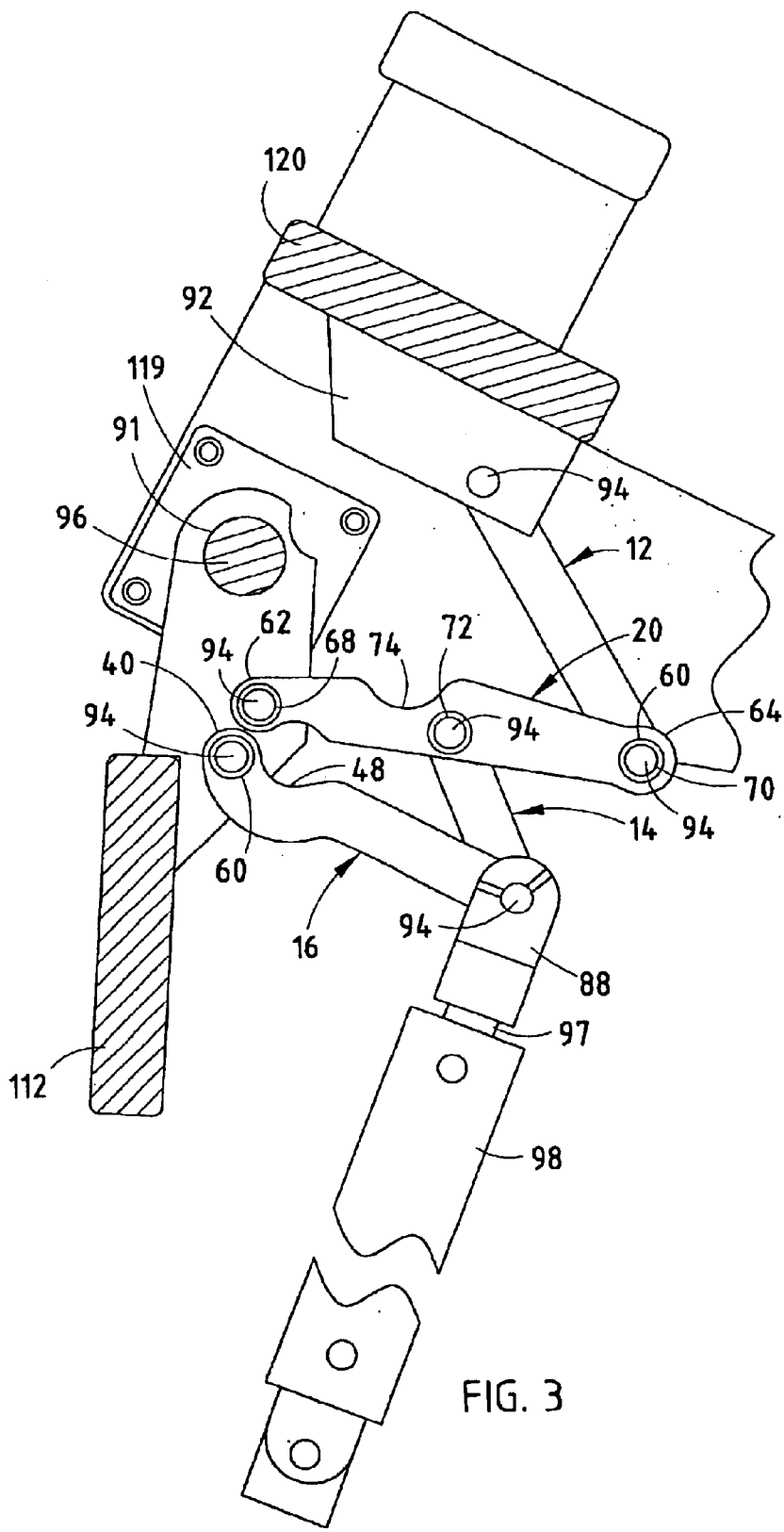
FIGS. 3–6 are elevated partial side views of the four-bar linkage as it is actuated from its partially activated position in FIG. 2 to its final dumping position in FIG. 5.
Figure 4:
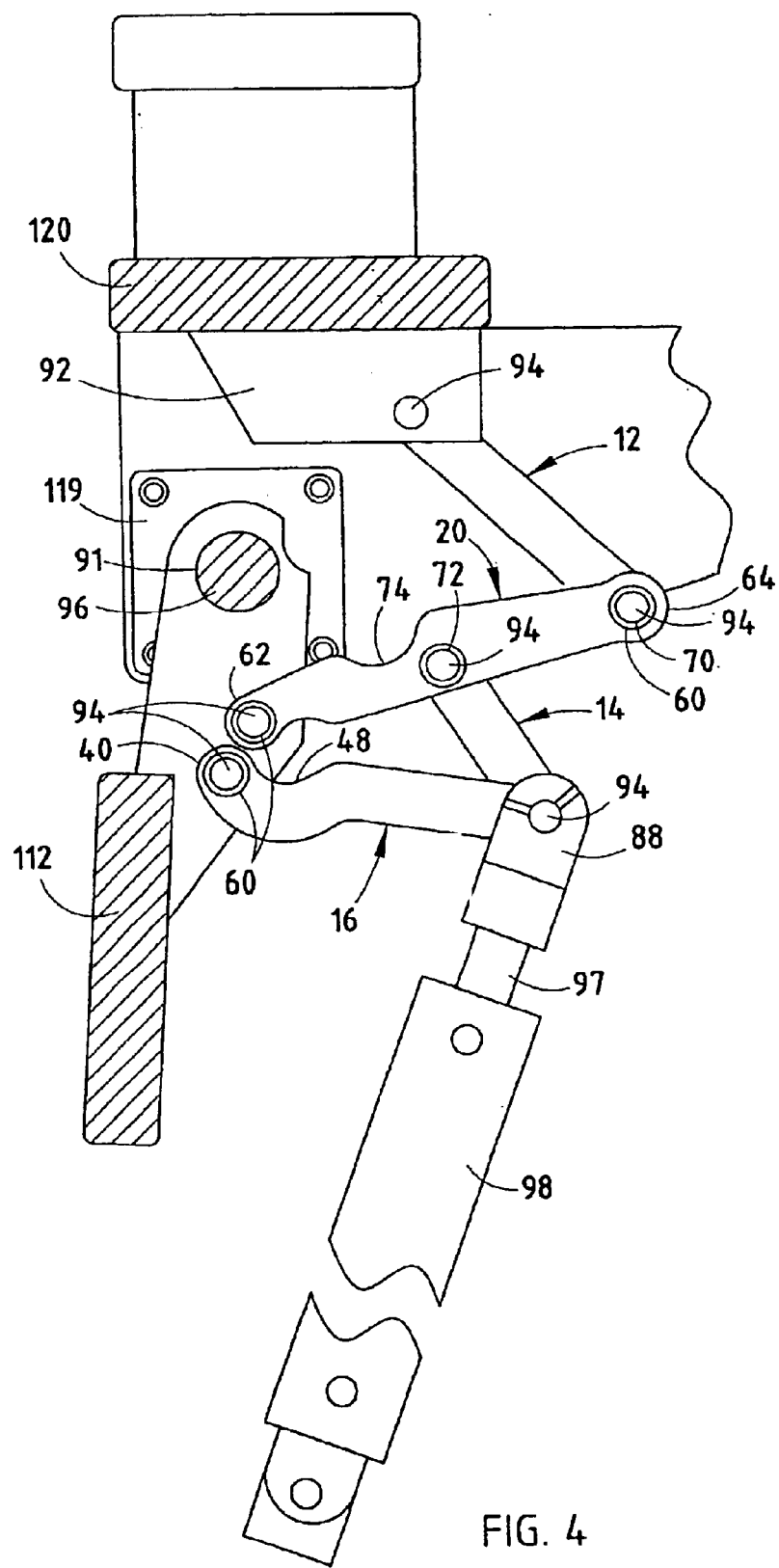
Figure 5:
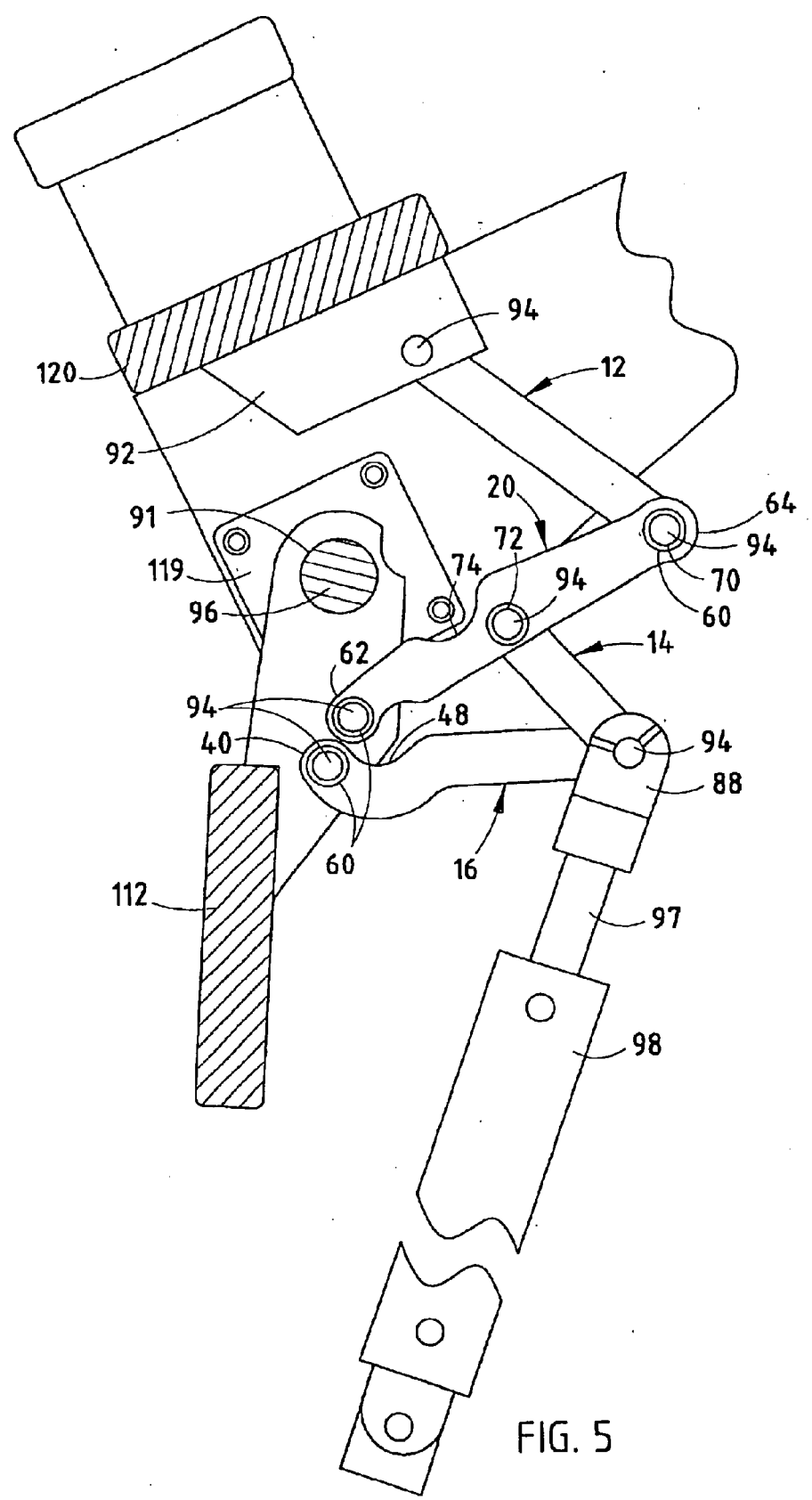

The four-bar linkage assembly described above is most typically and preferably employed as a component in a material transfer system 100, as shown in FIG. 2. The material transfer system 100 typically includes a material transfer/dumper frame section 102, a main frame section 104, and a material receiving hopper section 106.

The main frame section 104 includes two side walls (one side wall is shown in FIG. 1 and the other is on the opposite side of main frame section 104). Each side wall has three upright vertical support members 108 that extend upward from base or floor mount 111. A top horizontal member 116 interconnects the top of each of the vertical members 108. Two main horizontal supports interconnect the two main frame section side walls and are engaged, preferably by a weld using the horizontal member 112 and the lower horizontal main frame member 114. Main vertical support member 140 along vertical member 108' extends approximately 3/4 of the vertical distance up the vertical support member 108'. The main vertical support member 140 and vertical member 108" are interconnected by strengthening main diagonal support member 118. The center main vertical frame support member 120 provides added support for main rotating bar 96 and is engaged, preferably by a weld, to horizontal members 112 and 114. Preferably, polycarbonate safety guards 150 are mounted to the outer most vertical support members 108 on both sides of the main frame section 104 to protect the operator from loose or air-borne material.

The material transfer system 100 further includes a material transfer frame section 102 that includes main material transfer frame 105, which, in the preferred embodiment, is rectangular in shape. Engaged to the main material transfer frame 105 is an upper rim 122, which is preferably rectangular but could be any desired shape. The shape of upper rim 122 preferably substantially corresponds to the rim of material transfer container 134. Material transfer container 134 could be a box as depicted in FIG. 2, drum, tote, gaylord, barrel or any other container. Interconnecting the upper rim 122 on each side is a diagonal support 124. The diagonal support 124 is preferred, but not necessary if the material being transferred is light, but for safety reasons should be used. Also attached to main material transfer frame 104 are two hydraulically adjustable side walls 126, 128 with interior facing flanges 130, 132, which engage a container of material to be transferred 134.

A pour hood 136 is preferably spaced between the material transfer container 134 and the rim 122. The pour hood 136 is preferably manufactured of 304 stainless steel and corresponds in shape to engage rim 122. Most preferably, the pour hood 136 is a 304 stainless steel pour hood for dust-tight operation. The pour hood 136 preferably has a number 4 type finish, which is typically a 150–180 grit satin finish much like the stainless steel shutter found on a standard 3.5 inch floppy disk. Preferably, the dust-tight stainless steel pour hood 136 also includes a Müller stainless steel butterfly valve of desired diameter. In Applicant's preferred embodiment, an 8 inch diameter butterfly valve is used. The diameter of the butterfly valve may be selected depending upon the type of material being transferred such that material flows at the operator's desired speed. The butterfly valve can be easily removed for cleaning.

The material receiving section 106 preferably includes four vertical support members 152 and four lower horizontal support members 154, which are interconnected with the vertical support members 152. The number of support members can be varied as needed. Spaced within the resulting frame is the material receiving hopper 156 of desired shape. While Applicant's preferred embodiment utilizes a rectangular shape, the particular dimensions and shape of the material receiving hopper frame section 106 do not necessarily have to be rectangular, as depicted in FIG. 1, but may be other shapes as would be conveniently used by one of ordinary skill in the art. The material receiving hopper 156 may be anything that holds material (vat, bin, etc.) or, if desirable, could be completely removed from the system 100 such that the material being transferred is dumped onto the floor or ground.

Also included in the preferred material transfer system 100 is a control panel 170 and a hydraulic system 180. The hydraulic system 180 is housed in an enclosure with twin removable access panels. The hydraulic system 180 is connected with the hydraulic cylinders (both the linkage actuating cylinders and the optional side wall 126, 128 actuating cylinders), via ridged stainless steel hydraulic lines 182. The control panel 170 is a panel incorporating programmable logic controllers and proximity type switches. The electrical components in the unit preferably meet National Electrical Manufacturers Association (NEMA) Standard 4. Most preferably, the electrical components are NEMA 4 components, manufactured by Allen-Bradley.

In operation, the material transfer system 100 operates in the manner discussed below. Initially, a container of material 134 is loaded into the material transfer section 102. The flanges 132, 130 of the side walls 126, 128 should preferably be spaced under the material containing container 134. A material container 134 is typically placed into position using a fork lift due to its shear weight and size.

Next, the pour hood 136 is placed over the opening in the container 134. Once the stainless steel pour hood 136 is placed into position, the hydraulic cylinder driven side walls are activated until the material container 134 in the stainless steel pouring hood engages to the rim 122 of the material transfer section 102. It is important to note that, while not preferred, the hydraulic cylinder engagement of the side walls is not necessary, gravity will also work to hold the material container 134 and pour hood 136 in engagement with rim 122, especially when pour hood 136 has attachment flanges 137.

Once in position, the material transfer system's main hydraulic (linkage actuating) cylinders 98 are actuated and the material is rotated the full 180 degrees. There are, preferably one to three hydraulic cylinders and most preferably, two hydraulic cylinders, but the number of cylinders can vary with the load being transferred. Once the material is in the inverted position, as shown in FIG. 2, the material may be transferred from the container 134 into the hopper 156. The hydraulic cylinders 98 are then actuated to return the system to its starting position. The operator may easily remove the now empty material container 134.

The configuration of the four-bar linkage mechanism allows for especially heavy and sensitive material to be rotated at a steady rate throughout the entire 180 degree rotation of the material. This also allows for complete and steady rate emptying of the material container 134.

The above description is considered that of the preferred embodiments only. Modification of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A material transfer device comprising:
   a main support frame and a material transfer device rotatably connected to the main support frame, the material transfer frame adapted to hold a container of material to be transferred;
   a material receiving hopper connected to the main support frame;
   a linearly extensible powered actuator;
   a linkage assembly comprising:
      a center driving linkage having a first end and a second end and a first aperture at said first end, and a second aperture at said second end;
      a center interconnecting linkage with a first end and a second end and a first aperture at said first end, and a second aperture at said second end;
      a right hand support linkage having a first end and a second end, wherein a portion of the first end is at least partially curvilinear, said right hand support linkage having a first aperture at the first end, and a second aperture at the second end, wherein the second aperture of the right hand support linkage is substantially concentric with the second aperture of the center interconnecting linkage;
      a left hand support linkage having a first end and a second end, wherein a portion of the first end is at least partially curvilinear, said left hand support linkage having a first aperture at the first end, a second aperture at the second end, wherein the second aperture of the left hand support linkage is substantially concentric with the second aperture of the center interconnecting linkage;
      a right hand main linkage having a first end and a second end and a first aperture at said first end and a second aperture at said second end, and a third aperture between the first and second apertures wherein the second aperture is substantially concentric with the second aperture of the center driving linkage, and wherein the third aperture is substantially concentric with the first aperture of the center interconnecting linkage;
      a left hand main linkage having a first end and a second end and a first aperture at said first end, and a second aperture at said second end, and a third aperture between the first and second apertures, wherein the first aperture is substantially concentric with the second aperture of the center driving linkage, and wherein the third aperture is substantially concentric with the first aperture of the center interconnecting linkage;

wherein the first ends of the right and left hand support linkages are pivotably engaged with the main support frame at a first location, and the first ends of the right and left hand main linkages are pivotably engaged with the main support frame at a second location that is spaced apart from the first location, and the first end of the center driving linkage is rotatably engaged with the material transfer frame;

wherein each linkage is interconnected by pins spaced within each of the substantially concentric apertures and wherein:

the powered actuator has a first end connected to the main support frame, and a second end pivotably connected to the second ends of the right and left hand support linkages, such that the material transfer frame is rotated at least about one hundred and eighty degrees from a loading position to an inverted position upon actuation of the powered actuator to thereby permit transfer of material from a container connected to the transfer frame to the hopper.

2. The material transfer device of claim 1, wherein:
the at least partially curvilinear portions of the right and left hand support linkages define a concave surface to provide clearance for the first ends of the right and left hand main linkages as the transfer frame is rotated.

3. The material transfer device of claim 2, including:
a main bar member rotatably interconnecting the material transfer frame to the main support frame, and wherein:
the right and left hand main linkages each have a generally concave surface adjacent the third apertures thereof to provide clearance for the main bar as the transfer frame is rotated.

4. The material transfer device of claim 3, wherein:
the main bar contacts the concave surface of the right and left hand main linkages when the transfer frame is in the inverted position.

5. The material transfer device of claim 4, wherein:
the right and left hand main linkages are longer than the right and left hand support linkages.

6. The material transfer device of claim 5, wherein:
the first location is below the second location.

7. The material transfer device of claim 6, wherein:
the powered actuator comprises a hydraulic cylinder.

8. A material transfer device comprising:
a main support frame;
a dumper frame;
a hydraulic cylinder with a first end engaged to the main support frame, and
a second end;
a linkage assembly interconnecting the first end of the hydraulic cylinder and the dumper frame, the linkage assembly comprising:
a driving linkage defining a first end having a first aperture and a second end having a second aperture;
an interconnecting linkage defining a first end having a first aperture, and a second end having a second aperture;
a right hand support linkage having a first end and a second end, wherein a portion of the first end is at least partially curvilinear the right hand support linkage having a first aperture at the first end and a second aperture at the second end, wherein the second aperture of the right hand support linkage is substantially concentric with the second aperture of the interconnecting linkage;
a left hand support linkage having a first end and a second end, wherein a portion of the first end is at least partially curvilinear the left hand support linkage having a first aperture at the first end and a second aperture at the second end, wherein the second aperture of the left hand support linkage is substantially concentric with the second aperture of the interconnecting linkage;
a right hand main linkage defining a first end having a first aperture, and a second end having a second aperture, and a third aperture between the first and second apertures, wherein the second aperture is substantially concentric with the second aperture of the driving linkage, and wherein the third aperture is substantially concentric with the first aperture of the interconnecting linkage;
a left hand main linkage defining a first end having a first aperture, and a second end having a second aperture, and a third aperture between the first and second apertures, wherein the second aperture is substantially concentric with the second aperture of the driving linkage, and wherein the third aperture is substantially concentric with the first aperture of the interconnecting linkage;
wherein the driving linkage and the interconnecting linkage are positioned between the right and left hand support linkages and between the right and left hand main linkages;
wherein the first ends of the right and left hand support linkages and the first ends of the right and left hand main linkages are rotatably engaged with the main support frame at spaced apart locations, and wherein the first end of the driving linkage is rotatably engaged with the dumper frame;
wherein the second end of the hydraulic cylinder is pivotably interconnected with the second ends of right and left hand support linkages and with the second end of the interconnecting linkage; and wherein
the linkages are interconnected by pins disposed within each of the substantially concentric apertures.

9. The material transfer device of claim 8, further comprising:
a clevis bracket having a linkage engaging aperture, wherein the clevis bracket is engaged with the second end of the hydraulic cylinder and the interconnecting linkage.

10. The material transfer device of claim 9, wherein:
the linkage engaging aperture of the clevis bracket is substantially concentric with the second aperture of the interconnecting linkage and the clevis bracket is engaged with the interconnecting linkage via a pin engaging the linkage engaging aperture and the second aperture of the interconnecting linkage.

11. A material transfer device, comprising:
a main frame;
a material transfer frame adapted to support a container for transfer of material in the container;
a linkage assembly movably interconnecting the main frame and the material transfer frame, the linkage assembly comprising:

a support linkage having a first end pivotably connected to the main frame and a second end and a central portion between the first and second ends;

a main linkage having a first end pivotably connected to the main frame and a second end;

an interconnecting linkage having a first end pivotably connected to the central portion of the main linkage, the interconnecting linkage having a second end pivotably connected to the second end of the support linkage;

a driving linkage having a first end pivotably connected to the material transfer frame, and a second end pivotably connected to the second end of the main linkage; and a powered actuator operably coupled to the second ends of the support linkage and the interconnecting linkage and providing powered rotation of the material transfer frame through a range of motion of at least about one hundred and eighty degrees.

12. The material transfer device of claim 11, wherein:

the support linkage includes a generally concave surface portion providing clearance for the first end of the main linkage as the material transfer frame is moved relative to the main frame.

13. The material transfer device of claim 11, including:

a main bar rotatably interconnecting the material transfer frame to the main frame; and wherein:

the main linkage includes a generally concave surface portion adjacent the central portion providing clearance for the main bar.

14. The material transfer device of claim 11, wherein:

the powered actuator comprises a hydraulic cylinder pivotably connected to the main frame and to the second ends of the support linkage and the interconnecting linkage.

15. The material transfer device of claim 11, wherein:

the generally concave surface portion of the main linkage comprises a first concave portion, the main linkage including a second concave surface portion adjacent the first end of the main linkage providing clearance with the support linkage.

16. The method of transferring material comprising:

providing a material container that contains material a main support frame;

a hopper frame containing a hopper;

a pour hood;

a dumper frame comprising a rectangular primary and a rim;

a linkage actuating hydraulic cylinder with a frame engaging end engaged to the main support frame and an actuating end;

a four-bar linkage interconnecting the actuating end of the hydraulic cylinder and the dumper frame comprising:

a driving linkage having a first end and a second end and first and second apertures at each end;

a center force applying linkage with a first end and a second end and first and second apertures at each end;

a right hand support linkage having a first end and a second end where the second end is at least partially curvilinear with an aperture at the first end and the second end where the first end aperture of the right hand linkage is substantially concentric with the first aperture of the driving linkage;

a left hand support linkage having a first end and a second end where the second end is at least partially curvilinear with an aperture at the first end and the second end where the first end aperture of the left hand linkage is substantially concentric with the first aperture of the driving linkage;

a right hand main linkage having a first end and a second end and first and second apertures at each end and a third aperture between the first and second apertures where the first aperture is substantially concentric with the first aperture of the center force applying linkage, the third aperture is substantially concentric with the second aperture of the driving linkage;

a left hand main linkage having a first end and a second end and first and second apertures at each end and a third aperture between the first and second apertures where the first aperture is substantially concentric with the first aperture of the center force applying linkage, the third aperture is substantially concentric with the second aperture of the driving linkage;

wherein the second end of the right and left hand support linkages and the second end of the right and left hand main linkages are engaged with the main support frame and the second end of the driving linkage is engaged with the material transfer component; and wherein each linkages are interconnected by pins spaced within each of the substantially concentric apertures;

loading the material container into the dumper frame;

positioning the pour hood over the material container;

activating the linkage actuating hydraulic cylinder thereby rotating the material container and pour hood about 180 degrees until the pour hood engages the hopper; and releasing the contents of the material container into the hopper.

17. The method of transferring material of claim 16, further comprising:

deactivating the linkage actuating hydraulic cylinder to rotate the material container about 180 degrees back into substantially the same position as when the material container was loaded.

18. The method of transferring material of claim 16, wherein:

the dumper frame further comprises first and second side walls with flanges and two hydraulic cylinders engaging the side walls of the dumper frame and further comprising the step of activating the hydraulic cylinders to bring the flanges into engagement with the bottom of the material container and thereby also bring the top of the material container into engagement with the pour hood.

* * * * *